(12) United States Patent
Cho

(10) Patent No.: US 7,969,508 B2
(45) Date of Patent: Jun. 28, 2011

(54) METHOD AND APPARATUS FOR OUTPUTTING VIDEO SIGNAL IN FORMAT SUITABLE FOR TV

(75) Inventor: Eun-sung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1378 days.

(21) Appl. No.: 11/488,626

(22) Filed: Jul. 19, 2006

(65) Prior Publication Data

US 2007/0019110 A1    Jan. 25, 2007

(30) Foreign Application Priority Data

Jul. 21, 2005   (KR) ................. 10-2005-0066306

(51) Int. Cl.
*H04N 5/50* (2006.01)
(52) U.S. Cl. ....................................................... 348/555
(58) Field of Classification Search .................. None
See application file for complete search history.

(56) References Cited

U.S. PATENT DOCUMENTS

| | | | |
|---|---|---|---|
| 6,972,803 B2 * | 12/2005 | Seth-Smith et al. | 348/558 |
| 7,209,190 B2 * | 4/2007 | Katsube et al. | 348/838 |
| 7,536,151 B2 * | 5/2009 | Forsberg | 455/41.2 |
| 7,573,593 B2 * | 8/2009 | Hart et al. | 358/1.15 |
| 2003/0097304 A1 * | 5/2003 | Hunt | 705/22 |
| 2005/0229227 A1 * | 10/2005 | Rogers | 725/115 |
| 2007/0008130 A1 * | 1/2007 | Smith | 340/572.1 |
| 2007/0138302 A1 * | 6/2007 | Antoniou | 235/492 |
| 2009/0315670 A1 * | 12/2009 | Naressi et al. | 340/5.8 |
| 2010/0058397 A1 * | 3/2010 | Rogers | 725/60 |

FOREIGN PATENT DOCUMENTS

| | | |
|---|---|---|
| EP | 0 978 819 | 2/2000 |
| JP | 08-084299 | 3/1996 |
| KR | 1998-49466 | 9/1998 |
| KR | 2003-17626 | 3/2003 |
| WO | WO 2005/020237 | 3/2005 |
| WO | WO 2005/036325 | 4/2005 |

OTHER PUBLICATIONS

Search Report issued in European Patent Application No. 06117269.8 on Jan. 27, 2009.

* cited by examiner

*Primary Examiner* — Paulos M Natnael
(74) *Attorney, Agent, or Firm* — Jefferson IP Law, LLP

(57) ABSTRACT

A method and apparatus output a video signal in a format suitable for a TV. The method of outputting a video signal in a format suitable for a TV includes reading information from a radio frequency identification (RFID) tag attached to a TV receiver, extracting information regarding a TV output format from the read information, and outputting a video signal in the TV output format specified in the extracted information.

25 Claims, 6 Drawing Sheets

METHOD AND APPARATUS FOR OUTPUTTING VIDEO SIGNAL IN FORMAT SUITABLE FOR TV

CROSS-REFERENCE TO RELATED APPLICATIONS

This application claims the benefit of Korean Application No. 2005-66306, filed Jul. 21, 2005, in the Korean Intellectual Property Office, the disclosure of which is incorporated herein by reference.

BACKGROUND OF THE INVENTION

1. Field of the Invention

Aspects of the present invention relate to a method and apparatus for outputting a video signal to a television (TV) receiver, and more particularly, to a method and apparatus for outputting a video signal in a format suitable to a TV.

2. Description of the Related Art

In recent years, much research has been conducted into digital convergence technology, a technology where several electronic appliances are combined. Digital convergence technology is possible because basic data processing methods of digital electronic appliances are similar. As a result of the research conducted in recent years, digital electronic appliances are gradually replacing analog electronic appliances. Furthermore, with the development of home networks, data exchange among various types of appliances has become possible.

As a result of the research which has been conducted into combining TV receivers and computers, and into the interactions between them, video cards and the like have been developed that support the transmission of a video signal from a computer to a TV receiver. However, in order to transmit data from the computer to the TV receiver, data must be transmitted in an output format (i.e., signal transmission format) supported by the TV receiver. The TV output format indicates a manner in which a video signal is received from a computer and outputted or transmitted from the TV receiver to the TV monitor. However, it is often inconvenient for a user to have to determine the TV output format and set his or her computer accordingly.

Computers manufactured in a region may be exported to many different countries or continents, and a user may bring a notebook computer to many different countries or continents as well. In general, different TV output formats (e.g., PAL, SECAM, NTSC, and others) are used in different countries. Accordingly, the user has to manually change the settings of a computer to match a TV output format at an application level in order to connect the computer to a TV receiver and use the computer. However, in most cases, users do not know how to change computer settings appropriately, and thus they may give up trying to connect the computer to the TV receiver. Therefore, there is a growing need to solve the problem of inconveniencing users who have to manually change their computer settings to match a TV output format.

FIG. 1 is a view illustrating a conventional video output mechanism of a computer. An application 22 of the computer 200 transmits a video signal to a video controller 21 to output a still image or a moving image. The video controller 21 transmits the received video signal to a TV receiver 100. The video signal output from the computer 200 is transmitted to a video signal output unit 12 via a video signal input unit 11, so that a user can view the video. In this case, the video controller 21 controls the received video signal so that the video signal is output in a TV output format. Thus, the video controller 21 must detect an output format supported by the TV receiver 100 connected to the computer 200 to output the received video signal in the TV output format.

However, the TV receiver 100 is basically manufactured to satisfy a minimum of requirements for outputting video, and thus cannot transmit information regarding the output format supported by the TV receiver 100. Therefore, the user has to determine the TV output format (PAL, SECAM, or NTSC) that the connected TV receiver 100 uses, and set the video controller 21 to output the video in the TV output format. Accordingly, the user has to perform an additional process, thereby causing the user inconvenience.

SUMMARY OF THE INVENTION

Accordingly, aspects of the present invention have been made to solve the above-mentioned problems occurring in the related art, and an aspect of the present invention is to provide a video signal automatically adjusted to be suitable for a TV.

Another aspect of the present invention is to automatically detect a TV output format using a radio frequency identification (RFID) tag attached to a TV receiver, in order to automatically detect a TV output format, without the user having to perform an additional process or install software.

Additional advantages, aspects, and features of the invention will be set forth in part in the description which follows and in part will become apparent to those having ordinary skill in the art upon examination of the following, or may be learned from practice of the invention.

An aspect of the present invention provides a method of outputting a video signal that is suitable for a TV, which includes reading information from a radio frequency identification (RFID) tag attached to a TV receiver, extracting information regarding a TV output format from the read information, and outputting a video signal in the TV output format specified in the extracted information.

Another aspect of the present invention provides a computer system, which includes a radio frequency identification (RFID) reader that reads information regarding a TV output format from an RFID tag attached to a TV receiver, an application that provides a video signal, and a video controller that sets an output format of the video signal provided by the application according to the information regarding the TV output format read by the RFID reader, and that outputs the video signal to the TV receiver.

Another aspect of the present invention provides a digital video device including a radio frequency identification (RFID) reader that reads information regarding a TV output format from an RFID tag attached to a TV receiver, a storage unit that stores a video file of the video signal, and a video controller that sets an output format of the video signal provided from the storage unit according to the information regarding the TV output format read by the RFID reader.

In still another aspect of the present invention, there is provided a TV receiver which includes an RFID tag that stores information regarding a TV output format, a video signal input unit that receives a video signal according to the TV output format, and a video signal output unit that outputs the received video signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
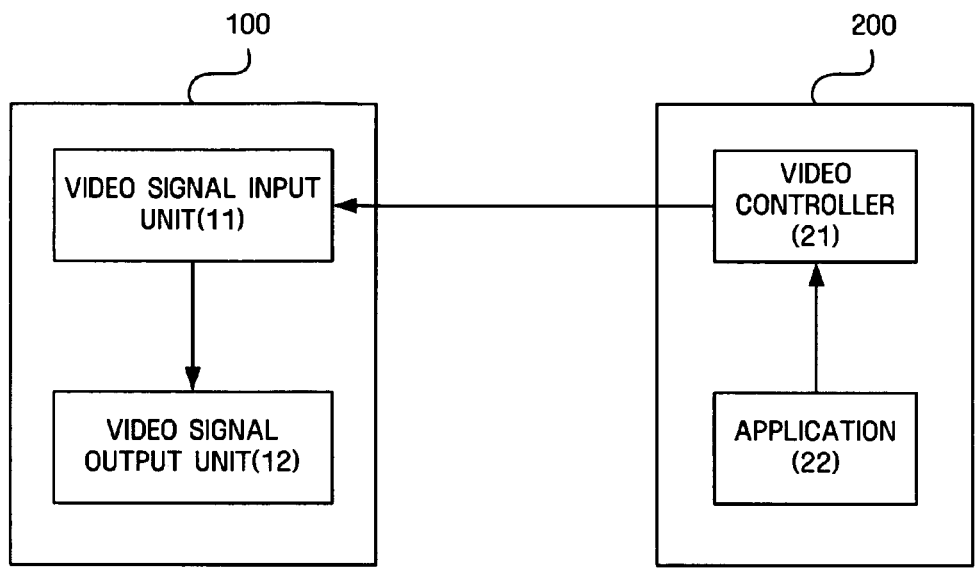
FIG. 1 is a block diagram illustrating the construction of a conventional video output mechanism of a computer.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a method and apparatus for outputting a video signal in a TV output format according to embodiments of the present invention will be described with reference to the block diagrams and flowcharts illustrated in the drawings. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatuses, create mechanisms and/or ways for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including an instruction set that implement the function specified in the flowchart block or blocks. The computer program instructions may also be loaded into a computer or other programmable data processing apparatus to cause a series of operations to be performed on the computer or other programmable apparatus in order to produce a computer implemented process such that the instructions that execute on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved. There are numerous different ways to implement the blocks in accordance with the present invention.

The term "unit", as used herein, i.e., "module" or "table", refers to, but is not limited to mean, a software or hardware component, such as a field programmable gate array (FPGA) or an application specific integrated circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and units or further separated into additional components and modules. In addition, the components and modules may be implemented so as to reproduce one or more CPUs in a device.

In the description, a TV output format may be NTSC, PAL, SECAM, or the like. However, the TV output format may also be a format other than these three formats.

NTSC stands for National Television Systems Committee in the United States or a television standard provided by NTSC. NTSC is a color TV system which has been used in the United States, Japan, Canada, and other countries, requires 525 interlaced scan lines, generates moving images with a frame rate of 30 frames per second, and uses a 4:3 aspect ratio, a 60 Hz frame rate, a video frequency range of 4.2 MHz, and an audio frequency range of 6 MHz.

PAL stands for Phase Alternation by Line, which is a color coding system that has been widely used in various countries, including some European countries. In particular, PAL is a system that requires 625 interlaced scan lines, generates moving images with a frame rate of 25 frames per second, uses a 50 Hz refresh rate, a video frequency range of 5.5 MHz, and an audio frequency range of 7 MHz, and has been employed mainly in Europe, and particularly in the United Kingdom.

SECAM stands for Sequential Couleur a Memoire. SECAM is a system that also requires 625 interlaced scan lines and generates an image of 25 frames per second. Secam has been employed in France and Eastern European countries.

The above three systems have been used as TV output formats for color TV receivers, and one of them is selected to output video information to a TV receiver.

Figure 2:
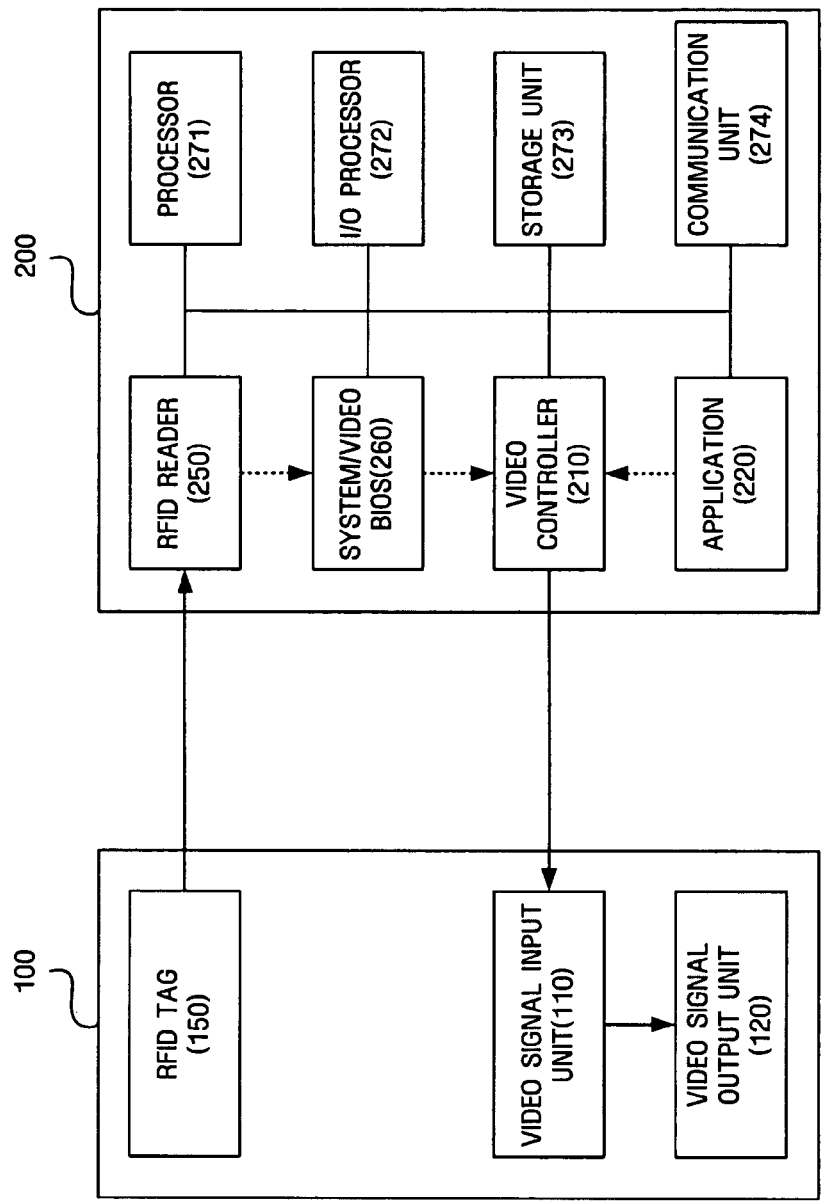
FIG. 2 is a block diagram illustrating the construction of a TV receiver connected to a computer according to an embodiment of the present invention.

FIG. 2 is a block diagram illustrating the construction of a TV receiver 100 connected to a computer 200 according to an embodiment of the present invention.

The TV receiver 100 includes a radio frequency identification (RFID) tag 150, a video signal input unit 110, and a video signal output unit 120. The RFID tag 150 contains information regarding the TV receiver 100 and is attached to the TV receiver 100.

RFID is a wireless identification technology that is used in many fields. RFID wirelessly transmits and receives information regarding a device to which the RFID tag is attached. Specifically, a specified identification (ID) is allocated to a device and information regarding the ID of the device is stored in the RFID tag. When the device with the RFID tag attached is in the range of a reader, wireless communications are performed between the device and the reader so that the reader can read the ID of the device. Also, both the specific identifier and required information may be stored in the tag.

In general, RFID tags can be classified into two types: active and passive. An active type RFID tag requires a power supply from a power source, e.g., a battery. The active type RFID tag operates with an operating power supplied from an external device or a battery installed in a non-metal case of the tag. The active type RFID tag is advantageous in that it reduces the power requirements of the RFID reader and can be used when the distance between the reader and a device is large. However, the active type RFID tag is disadvantageous in that its operating time is limited to the lifetime of the battery, and it is expensive compared to the passive type RFID tag.

The passive type RFID tag obtains its operating energy from an electromagnetic field generated by the RFID reader, and therefore the passive type RFID tag does not require an internal or external battery to operate. The passive type RFID tag is light, inexpensive, and semi-permanent compared to the active type RFID tag. However, the passive type RFID tag can only be used when the distance between the reader and the device is small, and the power requirements of the reader are greater than the active-type RFID system. The RFID tag 150 is attached to the TV receiver 100, and thus can be an active type that can receive power from a built-in battery or an external device. Of course, the RFID tag 150 may also be a passive type RFID tag and operate in accordance with the present invention.

The RFID tag 150 provides information regarding a TV output format of the TV receiver 100. The video signal input unit 110 receives a video signal from an external device. The video signal output unit 120 outputs the video signal received from the video signal input unit 110.

The TV output format indicates a manner in which a signal is outputted or transmitted from the TV receiver 100. The computer 200, which transmits a video signal to the TV receiver 100, includes an RFID reader 250, a system/video basic input/output system (BIOS) 260, a video controller 210, and an application 220. The computer 200 further includes a processor 271, an input/output (I/O) processor 272 that controls an input device such as a keyboard or a mouse, a storage unit 273 that stores data, and a communication unit 274 that communicates with other systems.

The RFID reader 250 reads information from the RFID tag 150 of the TV receiver 100. In this case, information regarding the TV output format of the TV receiver 100 is read by the RFID reader 250. A predetermined value denotes each TV output format so that the RFID reader 250 can determine the TV output format by reading the predetermined value. Additionally, the TV output format may be determined by reading the country code information of the TV receiver 100. For instance, when the country code is determined as the code of a country that uses the PAL system, the TV output format is PAL. In addition to storing a TV output format and/or a country code, the RFID tag 150 may store information regarding the resolution of the display device and the frequency setting and, therefore, the TV output format may be set based on the resolution and frequency settings.

The information read by the RFID reader 250 is transmitted to the system/video BIOS 260. However, it is difficult to include detailed information in the RFID tag 150 due to its limited memory capacity. Thus, when the RFID reader 250 reads the information from the RFID tag 150, the system/video BIOS 260 may be used to transmit the information regarding the TV output format of the TV receiver 100 to the video controller 210 according to the information stored in the RFID tag 150. Alternatively, the RFID reader 250 may transmit the read information directly to the video controller 210, and the video controller 210 may adjust the TV output format so that it is suitable for the TV receiver 100.

The video controller 210 receives a still image or a moving image from the application 220, and outputs it to a computer monitor (not shown) or the TV receiver 100. When the still image or the moving image is output to the TV receiver 100, it is output in the TV output format of the TV receiver 100.

The application 220 reproduces and outputs the still image or the moving image. Data output from the application 220 is transformed by the video controller 210 to match the TV output format of the TV receiver 100. As a result, the user can enjoy the TV output without having to manually adjust his or her device to match the TV output format.

The construction illustrated in FIG. 2 can be applied to a notebook computer, a PC, a DVD player, a VCR, and numerous other devices. Also, the construction illustrated in FIG. 2 can be applied to a personal video recorder (PVR), a handheld PC (HPC), a personal digital appliance (PDA), a personal multimedia player (PMP), and numerous other devices.

Figure 3:
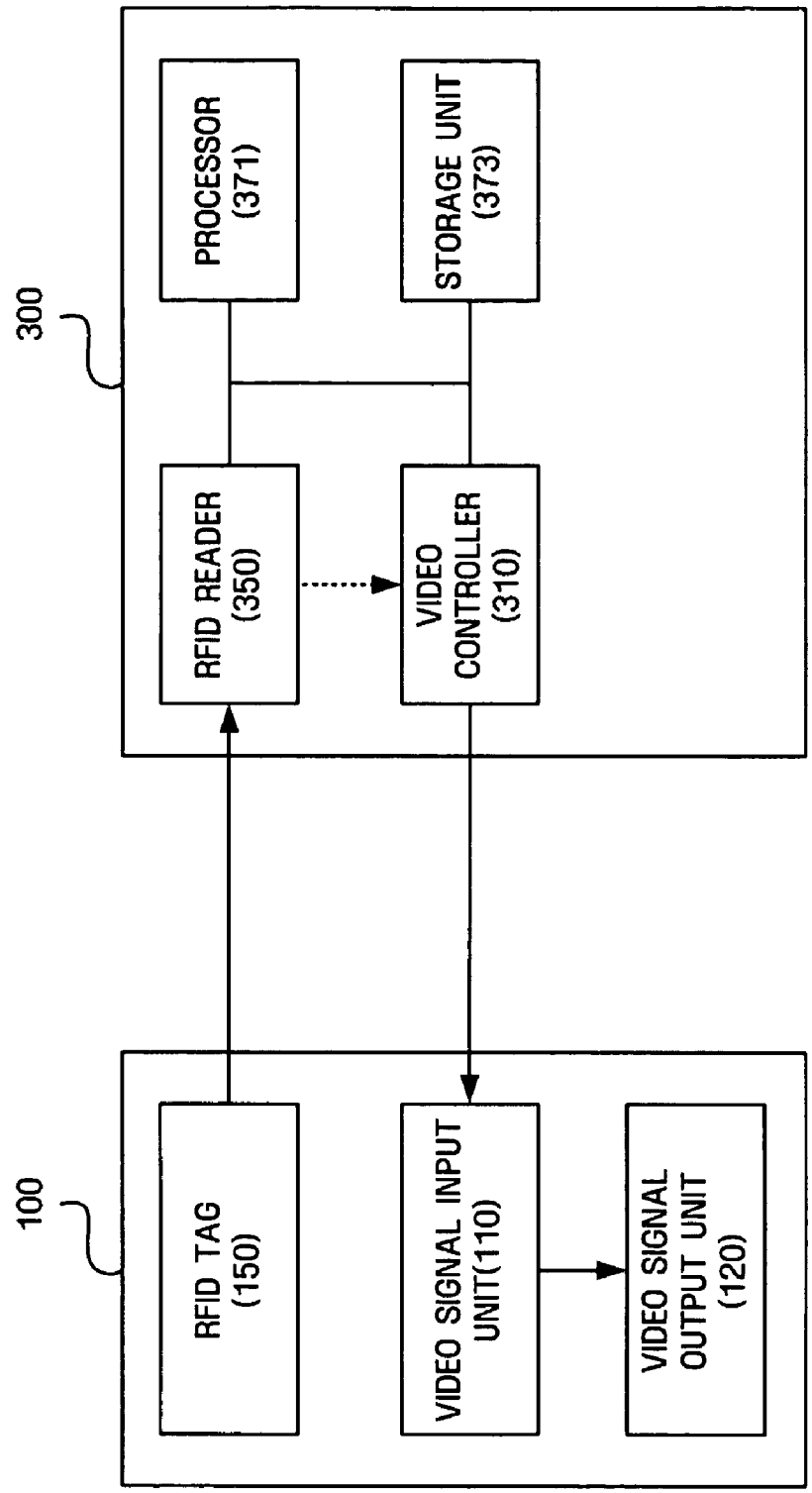
FIG. 3 is a block diagram illustrating the construction of a TV receiver connected to a digital camera according to an embodiment of the present invention.

FIG. 3 is a block diagram illustrating the construction of a TV receiver 100 connected to a digital camera 300 according to an embodiment of the present invention.

The construction of the TV receiver 100 has been described with reference to FIG. 2. Referring to FIG. 3, an RFID reader 350 is installed in the digital camera 300. The RFID reader 350 reads information regarding a TV output format of the TV receiver 100 from an RFID tag 150 attached to the TV receiver 100. The read information is used when a video controller 310 transforms an image file or a moving image file stored in a storage unit 373 to match the TV output format of the TV receiver 100.

The storage unit 373 stores the image file or the moving image file. Typically, the storage unit 373 is a non-volatile memory such as, for example, a flash memory. A processor 371 serves as a CPU that controls the operation of the digital camera 300. The construction illustrated in FIG. 3 can be applied to a moving image capturing appliance, such as a digital camcorder, and can also be applied to a digital video appliance, as well as other devices.

Figure 4:
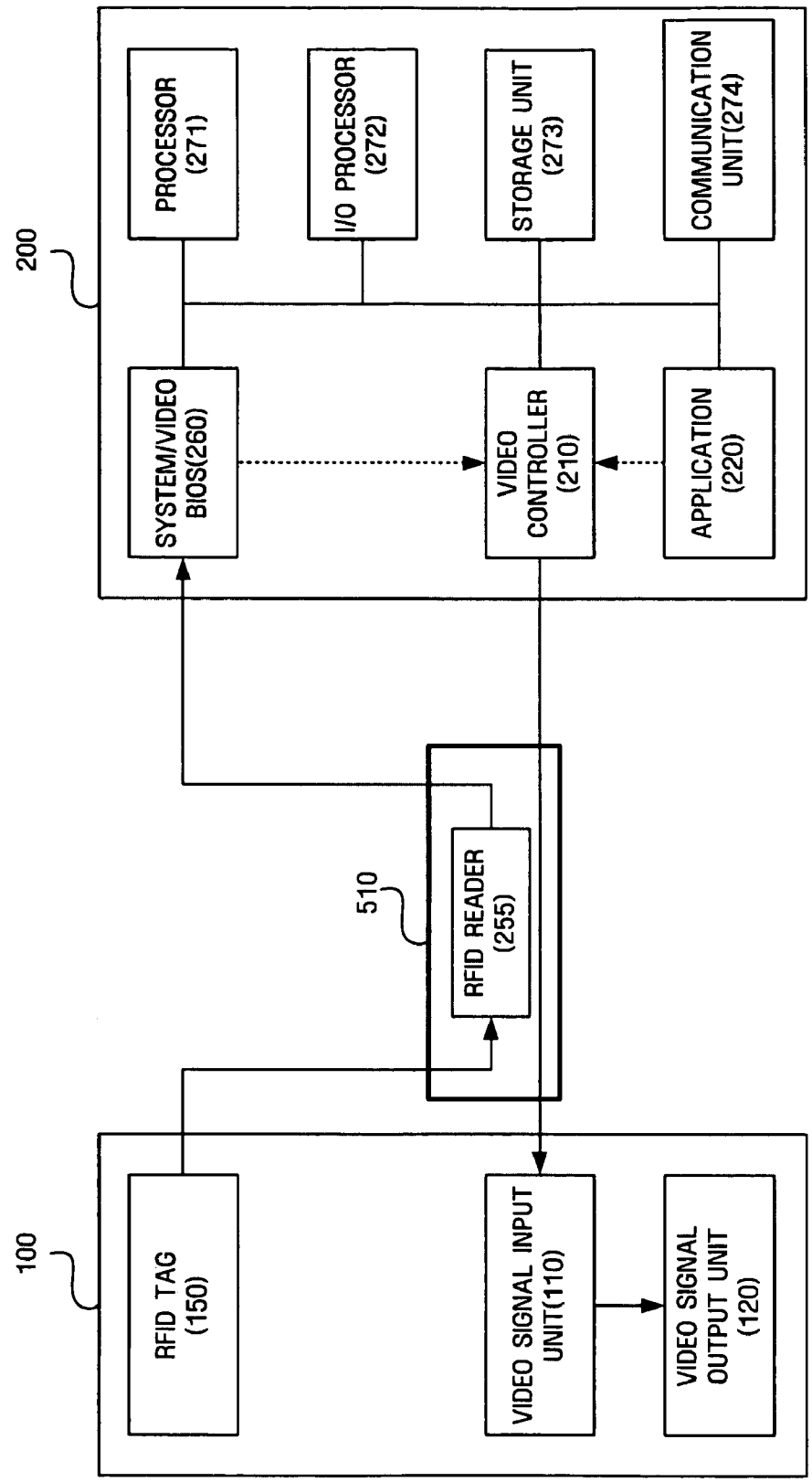
FIG. 4 is a block diagram illustrating the construction of a radio frequency identification (RFID) reader installed outside a computer according to an embodiment of the present invention.

FIG. 4 is a block diagram illustrating the construction of a radio frequency identification (RFID) reader installed outside a computer according to an embodiment of the present invention. Other constituent elements illustrated in FIG. 4 are the same as those shown in FIG. 2, and a detailed explanation thereof has been omitted.

When the TV receiver 100 is far from the computer 200 and they are connected via a cable, it is difficult for the RFID reader installed in the computer 200 to read information from the RFID tag 150 attached to the TV receiver 100. To solve this problem, the RFID reader 255 may be mounted on a line 510 that connects a video controller 210 of the computer 200 and a video signal input unit 110 of the TV receiver 100. If the RFID reader 255 is mounted on a cable or the line 510 close to the TV receiver 100, the RFID reader 255 can read data from the RFID tag 150 of the TV receiver 100. The RFID reader 255 transmits the read data to the system/video BIOS 260 or the video controller 210 of the computer 200 via the line 510, and the video controller 210 transforms the data received from an application 220 to match the TV output format of the TV receiver 100 to output the transformed data according to the received information. It may be possible to detach both the RFID reader 255 and the RFID tag 150 in order to move the RFID reader 255 and the RFID tag 150 close enough together to exchange data about the TV receiver 100. Additionally, it may be possible to use a series of RFID tags and RFID readers in order to transmit information about a TV output format over a long distance.

Figure 5:
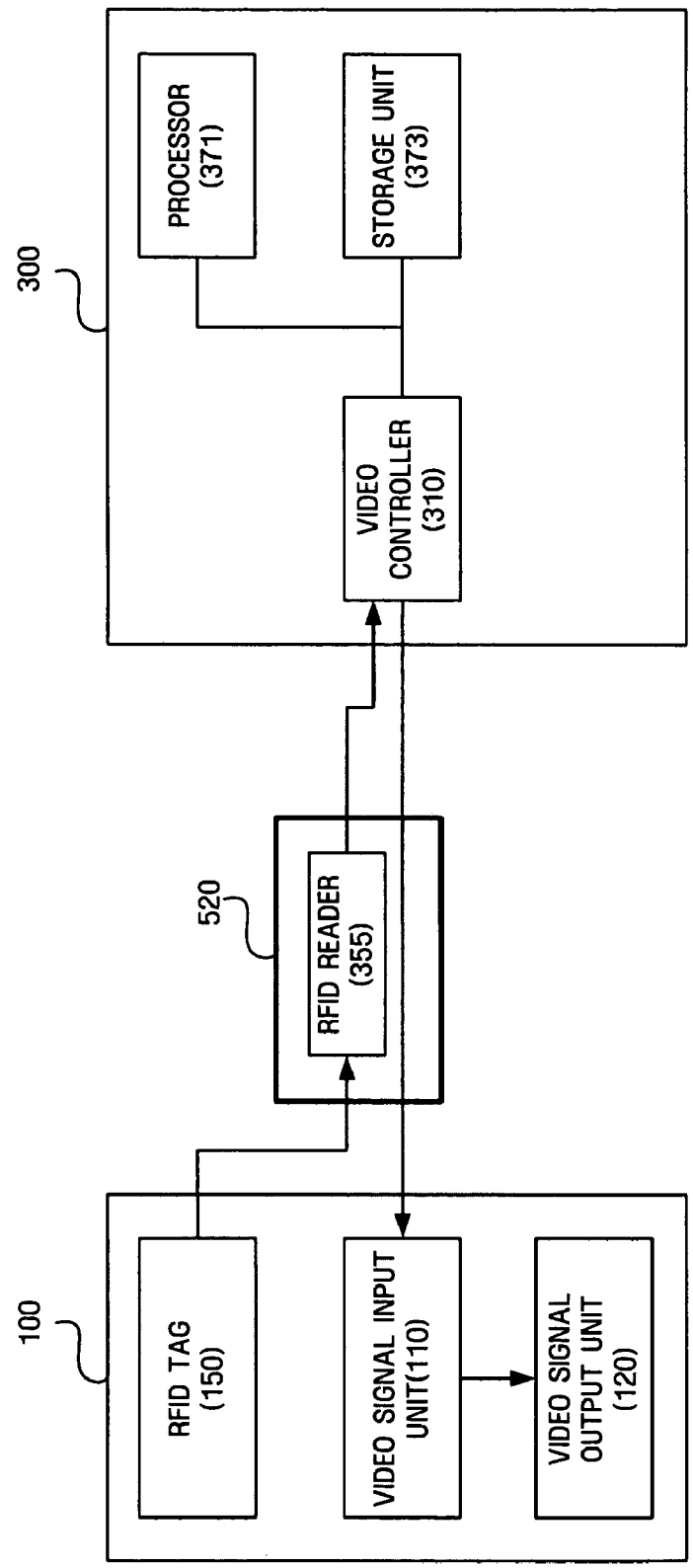
FIG. 5 is a block diagram illustrating the construction of an RFID reader installed outside a digital camera according to an embodiment of the present invention.

FIG. 5 is a block diagram illustrating the construction of an RFID reader installed outside a digital camera according to an embodiment of the present invention. The constituent elements illustrated in FIG. 5 are the same as those illustrated in FIG. 3, except for the RFID reader 355.

Similar to the RFID reader 255 FIG. 4, the RFID reader 355 in FIG. 5 is installed on a cable or a line 520 that connects the TV receiver 100 and the digital camera 300. If the RFID reader 355 is installed on the cable or the line 520 close to the TV receiver 100, the RFID reader 355 can read data from the RFID tag 150 attached to the TV receiver 100. The RFID reader 355 transmits the read information to the video controller 310 of the digital camera 300 via the line 520 so that the video controller 310 can transform data from the storage unit 373 to match the TV output format of the TV receiver 100. The transformed data is then outputted from the digital camera 300 to the TV receiver 100 according to the received information.

Figure 6:
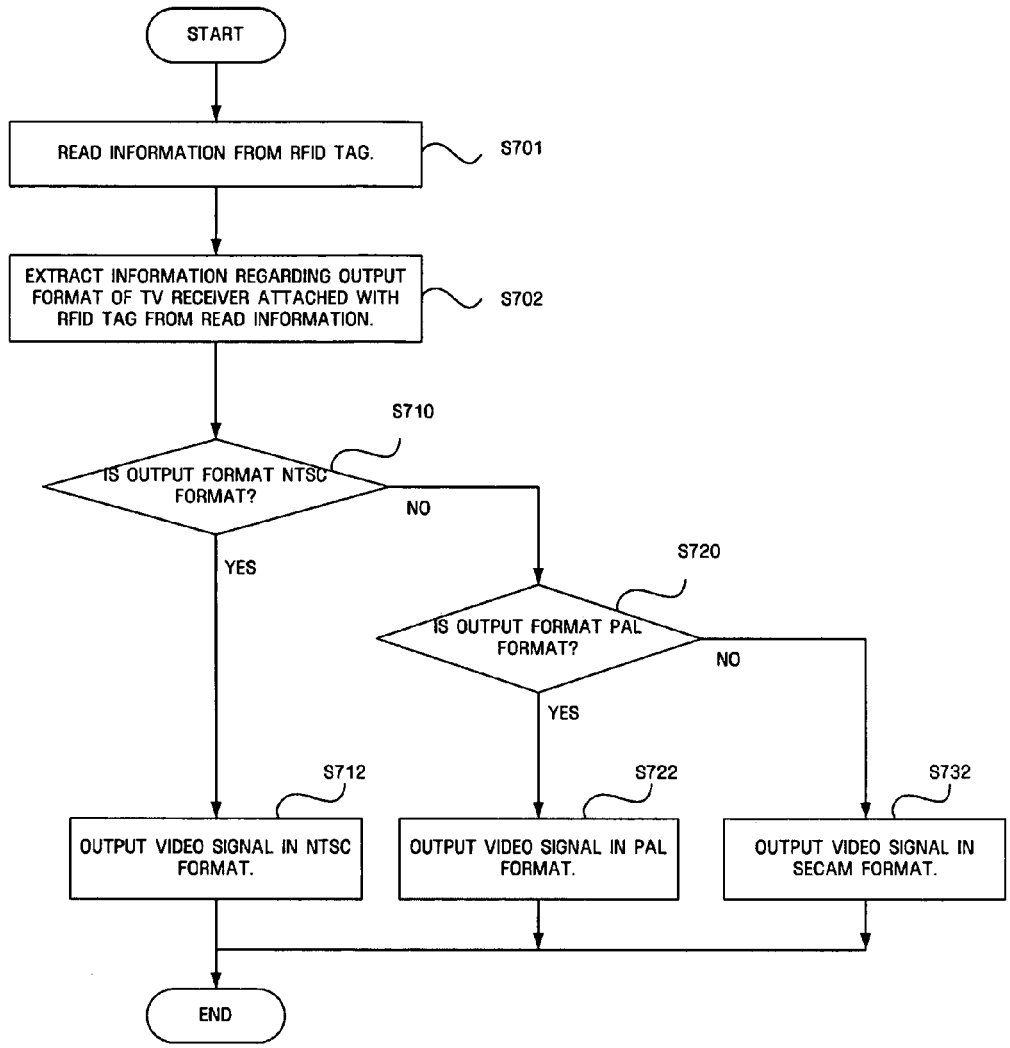
FIG. 6 is a flowchart illustrating a method of reading data from an RFID tag attached to a TV receiver through a computer or a digital camera according to an embodiment of the present invention.

FIG. 6 is a flowchart illustrating a method of reading data from an RFID tag attached to a TV receiver through a computer or a digital camera according to an embodiment of the present invention.

First, data is read from the RFID tag S701. For this, the RFID reader is required. Then, information regarding the TV output format of the TV receiver to which the RFID tag is attached is extracted from the read data S702. The extracted information may specify an area in which the TV receiver was sold or is expected to be sold, or the TV output format of the TV receiver (e.g., frequency, resolution, etc.). In addition, the extracted information may specify whether the TV output format corresponds to the NTSC system, the PAL system, or the SECAM system.

If the extracted information indicates that the TV output format corresponds to the NTSC system S710, a video signal is outputted in NSTC format S712. If the extracted information indicates that the TV output format corresponds to the PAL format S720, the video signal is outputted in the PAL format S722. If the extracted information indicates that the TV output format corresponds to the SECAM format, the video signal is outputted in the SECAM format S732. If the TV output format corresponds to none of the NTSC system, the PAL system or the SECAM system, the video signal may be outputted in the corresponding format.

As described above, according to aspects of the present invention, a user can output a video signal to a user's TV receiver using a computer or a digital camera without the necessity of acquiring information regarding the TV output format of the TV receiver.

Accordingly, it is possible to make a video-related appliance such as a computer or a digital camera, which can be exported or carried to many countries, automatically output a video signal in a format that is suitable for the corresponding country. Thus, the present saves a user from the inconvenience of having to manually adjust a device to output the suitable output format.

Although embodiments of the present invention have been described for illustrative purposes, those skilled in the art will appreciate that various modifications, additions and substitutions are possible, without departing from the scope and spirit of the invention as disclosed in the accompanying claims. Therefore, the right scope of the present invention is not limited to the embodiments, but must be defined by the appended claims or the equivalence thereof.

What is claimed is:

1. A method of outputting a video signal from a device in a format corresponding to a TV output format, comprising:
   reading information from a radio frequency identification (RFID) tag attached to a TV receiver;
   extracting information regarding the TV output format from the read information; and
   outputting the video signal from the device in the TV output format specified in the extracted information.

2. The method of claim 1, wherein the information regarding the TV output format comprises information regarding at least one of a country in which the TV receiver is used, a frame rate, a number of scan lines, a video frequency range, and an audio frequency range.

3. The method of claim 1, wherein the TV output format corresponds to one of an NTSC system, a PAL system, or a SECAM system.

4. The method of claim 1, further comprising determining the TV output format of the video signal to be output according to the read information after extracting the information.

5. The method of claim 4, wherein the determining of the TV output format of the video signal comprises matching the TV output format of the video signal with a scanning type or resolution of the TV receiver.

6. A computer system comprising:
   a radio frequency identification (RFID) reader which reads information regarding a TV output format from an RFID tag attached to a TV receiver;
   an application which provides a video signal to the TV receiver; and
   a video controller which adjusts an output format of the video signal provided by the application according to the information regarding the TV output format read by the RFID reader, and outputs the adjusted video signal to the TV receiver.

7. The computer system of claim 6, wherein the information regarding the TV output format comprises information regarding at least one of a country in which the TV receiver is used, a frame rate, a number of scan lines, a video frequency range, and an audio frequency range.

8. The computer system of claim 6, wherein the TV output format corresponds to one of an NTSC system, a PAL system, or a SECAM system.

9. The computer system of claim 6, further comprising a basic input/output system (BIOS) which processes and transmits the information read by the RFID reader to the video controller so that the video controller adjusts the output format of the video signal.

10. The computer system of claim 9, wherein the video controller adjusts the output format of the video signal according to a scanning type or resolution of the TV receiver.

11. The computer system of claim 6, wherein the RFID reader is mounted on a cable which connects the computer system to the TV receiver.

12. A digital video device comprising:
   a radio frequency identification (RFID) reader which reads information regarding a TV output format from an RFID tag attached to a TV receiver;
   a storage unit which stores a video file that provides a video signal; and
   a video controller which sets an output format of the video signal provided by the storage unit according to the information regarding the TV output format read by the RFID reader.

13. The digital video device of claim 12, wherein the information regarding the TV output format comprises information regarding at least one of a country in which the TV receiver is used, a frame rate, a number of scan lines, a video frequency range, and an audio frequency range.

14. The digital video device of claim 12, wherein the TV output format corresponds to one of an NTSC system, a PAL system, or a SECAM system.

15. The digital video device of claim 12, wherein the video controller sets the output format of the video signal according to a scan type or resolution of the TV receiver.

16. The digital video device of claim 12, wherein the RFID reader is mounted on a cable which connects the digital video device to the TV receiver.

17. A TV receiver comprising:
   an RFID tag that stores information regarding a TV output format;
   a video signal input unit that receives a video signal according to the TV output format; and
   a video signal output unit that outputs the received video signal.

18. The TV receiver of claim 17, wherein the information regarding the TV output format comprises information regarding at least one of a country in which the TV receiver is used, a frame rate, a number of scan lines, a video frequency range, and an audio frequency range.

19. The TV receiver of claim 17, wherein the video signal input unit receives video signals from a computer system, a digital video device, a DVD player, or a VTR.

20. An apparatus, comprising:
   a TV receiver having an RFID tag with information relating to a TV output format; and
   a device having an RFID reader, wherein the device outputs a video signal in the TV output format corresponding to the TV receiver.

21. The apparatus of claim 20, wherein the RFID reader is detachably attached to the device.

22. The apparatus of claim 20, wherein the RFID tag is detachably attached to the TV receiver.

23. The apparatus of claim 21, wherein the RFID tag is detachably attached to the TV receiver.

24. The apparatus of claim 20, wherein the RFID reader is attached to the TV receiver via a cable which connects the device to the TV receiver.

25. A method of automatically identifying an output format of a TV receiver and outputting a video signal in a corresponding format from a device, comprising:
   storing information regarding the output format in an RFID tag which is detachably attached to the TV receiver; and
   locating an RFID reader close enough to the RFID tag to detect the output format of the TV receiver.

* * * * *